No. 727,228.
PATENTED MAY 5, 1903.
J. E. TONKS & W. G. S. SYMMONS.
KETTLE OR LIKE UTENSIL.
APPLICATION FILED FEB. 27, 1902.
NO MODEL.
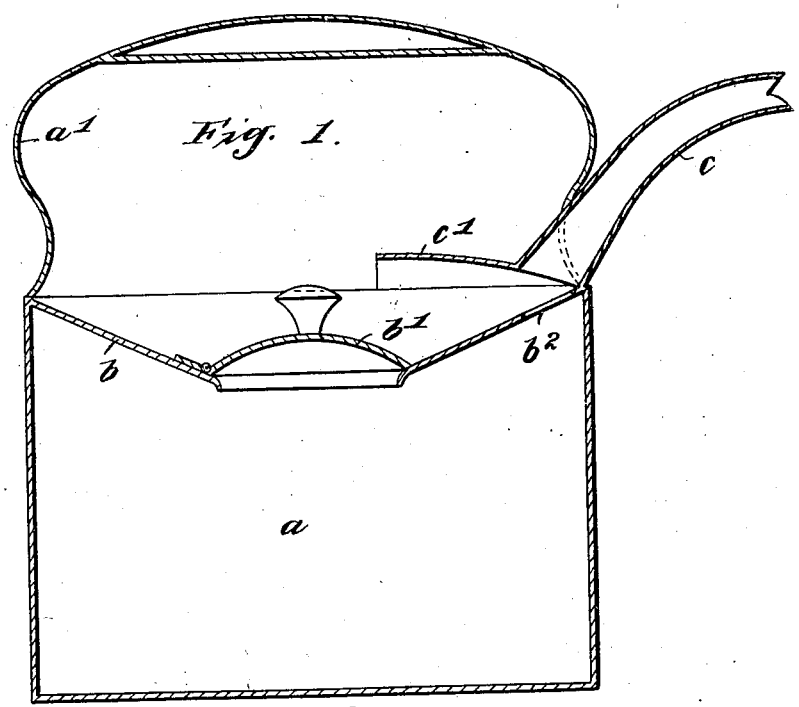
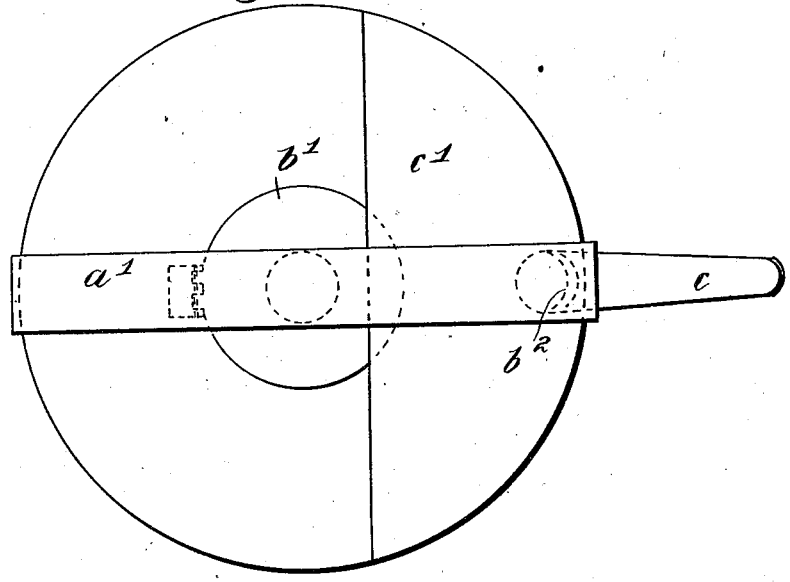
Witnesses
William James Cox.
Frank William Pattison.
Inventors
John Edgar Tonks,
William George Saunders Symmons,
By their Attorney
Geo. H. Rayner No. 727,228. Patented May 5, 1903.

UNITED STATES PATENT OFFICE.

JOHN EDGAR TONKS, OF KNOWLE, AND WILLIAM GEORGE SAUNDERS SYMMONS, OF LONDON, ENGLAND.

KETTLE OR LIKE UTENSIL.

SPECIFICATION forming part of Letters Patent No. 727,228, dated May 5, 1903.

Application filed February 27, 1902. Serial No. 95,984. (No model.)

*To all whom it may concern:*

Be it known that we, JOHN EDGAR TONKS, residing at Dorridge, Knowle, in the county of Warwick, and WILLIAM GEORGE SAUNDERS SYMMONS, residing at Mairi Bhan, 42 Westbere road, West Hampstead, in the county of London, N. W., England, subjects of the King of Great Britain and Ireland, have invented certain new and useful Improvements in and Relating to Kettles or like Utensils, of which the following is a specification.

This invention relates to kettles and utensils of a like nature in which liquids are boiled, and provides a means by which all danger of boiling over may be avoided.

As applied to kettles, for which this invention is especially serviceable, the kettle is formed with a lower or main part for holding the water or liquid to be boiled and with an upper open air-chamber. The spout is connected to the air-chamber, and a hole is provided in the bottom of the air-chamber just under the spout and communicates with the main or water chamber. The kettle is formed with a large inwardly-extending rim or flange of truncated conical form, the inner edge dipping considerably below the outer. A small lid can be fitted in an opening at the center of the inwardly-extending flange. The rim is formed with a small opening immediately below the inner end of the spout, which is carried by an overhanging flange or lip.

In order that this invention may be more readily understood, reference is had to the accompanying sheet of drawings, in which—

Figure 1 is a vertical section of a kettle having our invention applied to it, and Fig. 2 is a plan of the same.

$a$ is the body of the kettle, which may be of any suitable form and is provided with a handle $a'$ of the usual kind. To the upper edge of this kettle is fitted the conical rim or top $b$, which extends downwardly into the kettle, having an opening at the center closed by any suitable lid $b'$. This rim or top leaves an annular cavity around the upper edge of the kettle which is always clear of the water and forms a steam-chamber.

The spout $c$ is not fitted directly to the body of the kettle, but is carried by the overhanging lip or flange $c'$, which covers the front part of the conical rim $b$ and forms a chamber free from water. The conical rim or top is formed with the opening $b^2$ immediately below the spout, so that on tilting the kettle the liquid can flow through the opening and thence through the spout, the overhanging lip preventing any overflow. Owing to the separation of the spout and the body of the kettle any water which might be forced up by violent boiling cannot be ejected through the spout, as there is no pressure of steam behind it in the chamber formed by the lip $c'$, and the water thus falls back into the kettle.

The effect of the conical top, together with the hole $b^2$, is to provide a steam-chamber which is open to the atmosphere above the surface of the water, so that the steam generated almost entirely passes into this chamber and is allowed to escape freely. Should the ebullition be very violent, the water may be forced through the hole $b^2$, but merely falls back down the sloping sides through the lid into the kettle. As shown, the lid is hinged and is arranged to allow the water to pass back into the kettle.

The essential feature of our invention lies in the separation of the spout from the body of the kettle, and the conical flange shown is only one way in which a separating-chamber between the spout and vessel proper may be formed.

What we claim, and desire to secure by Letters Patent, is—

1. Kettles and like utensils consisting of a lower or water chamber, an upper open or air chamber having an opening near its outer edge to the lower chamber and a spout connected to the air-chamber just above the said opening.

2. Kettles and like utensils consisting of a lower or water chamber, an upper open or air chamber having an opening near its outer edge to the lower chamber and an inwardly-extending overhanging lip or flange, and a spout connected to the air-chamber just above the said opening and carried by the overhanging lip.

3. Kettles and other cooking or heating utensils consisting of a lower or water chamber having an inwardly and downwardly extending rim or top provided with an opening near its outer edge, an annular open or air chamber above the surface of the liquid and a spout connected to the air-chamber above the said opening.

4. Kettles and other cooking or heating utensils consisting of a lower or water chamber having an inwardly and downwardly extending rim or top provided with an opening near its outer edge and with a central opening, an annular open or air chamber above the surface of the liquid and a spout connected to the air-chamber above the said opening.

In witness whereof we have hereunto set our hands in the presence of two witnesses.

JOHN EDGAR TONKS.
WILLIAM GEORGE SAUNDERS SYMMONS.

Witnesses as to the signature of John Edgar Tonks:
HENRY ALFRED WOODBRIDGE,
ROGELIO PLAZA.

Witnesses as to the signature of William George Saunders Symmons:
DAVID WISEMAN,
SYDNEY JOHN HOOPER.